United States Patent [19]

Denny

[11] 4,093,899

[45] June 6, 1978

[54] CIRCUIT AND METHOD FOR CONTROLLING SPEED OF AN ALTERNATING CURRENT MOTOR

[75] Inventor: Dann W. Denny, Morrison, Ill.

[73] Assignee: General Electric Company, Fort Wayne, Ind.

[21] Appl. No.: 715,280

[22] Filed: Aug. 18, 1976

Related U.S. Application Data

[62] Division of Ser. No. 548,764, Feb. 10, 1975, Pat. No. 4,007,605.

[51] Int. Cl.² ............................................. H02P 5/40
[52] U.S. Cl. ................................. 318/227; 318/229; 318/230
[58] Field of Search .................... 318/227, 230, 229

[56] References Cited

U.S. PATENT DOCUMENTS

| | | | |
|---|---|---|---|
| 3,196,629 | 7/1965 | Wood | 318/227 UX |
| 3,403,314 | 9/1968 | Maynard | 318/227 |
| 3,415,071 | 12/1968 | Kompelien | 318/227 UX |
| 3,613,391 | 10/1971 | Harter | 318/227 X |

*Primary Examiner*—Gene Z. Rubinson
*Attorney, Agent, or Firm*—Joseph E. Papin

[57] ABSTRACT

A circuit for controlling the speed of an alternating current motor. The circuit has a gate controlled full wave alternating current switch coupled in series relation with the motor, and a phase control circuit coupled in parallel relation with the switch is operable generally for providing signals indicative of the occurrence of a preselected condition. Means is provided for transmitting the indicative signals to the gate of the switch to control the duration of the conduction thereof in either direction and thereby vary the energy delivered to the motor so as to control its speed in accordance with the occurrence of the preselected condition.

A method of controlling the speed of an alternating current motor is also disclosed.

11 Claims, 7 Drawing Figures

CIRCUIT AND METHOD FOR CONTROLLING SPEED OF AN ALTERNATING CURRENT MOTOR

CROSS-REFERENCE TO RELATED APPLICATION

This application is a division of copending application Ser. No. 548,764 filed Feb. 10, 1975, and now U.S. Pat. No. 4,007,605 the contents of which are specifically incorporated by reference herein.

BACKGROUND OF THE INVENTION

This invention relates generally to electrical circuitry and in particular to a circuit and a method for controlling the speed of an alternating current motor.

In the past, various types of refrigeration systems and controls therefor have been utilized for cooling a given space. In general, the past refrigeration systems were provided with an expansion valve for the expansion of a liquid refrigerant supplied thereto from a condenser into a gaseous state which was then delivered through an evaporator for cooling purposes to a compressor. The compressor pumped the system refrigerant through a plurality of coils in the condenser where it was condensed back to its liquid state. A fan motor was also utilized in the refrigeration system to flow ambient air generally in a path over the coils of the condenser to aid in the condensation of the generally gaseous refrigerant flowing through the condenser coils from the compressor toward the expansion valve. It is well known that the efficiency of a refrigeration system may be impaired thereby to create other problems if the condenser temperature varies substantially from a preferred or selected temperature value or a temperature value range.

It is desirable to pass enough air over the condenser coils to maintain the refrigerant in a gaseous state generally at the compressor end portion of the condenser coils and in a liquid state generally at the expansion valve end portion of the condenser coil for supplying the liquid refrigerant to the expansion valve. Of course, the amount of air flowed by the fan motor over the condenser coils to maintain this balance between the gaseous and liquid phases of the refrigerant in the compressor coils is a function of the temperature of the ambient air flowed by the fan motor over the condenser. By properly controlling the speed of the fan motor, the head pressure of the compressor may be maintained generally constant thereby to provide proper refrigerant pressure at the inlet side, i.e. the condenser side, of the expansion valve. One such related circuit for controlling the speed of a fan motor is disclosed in my aforementioned copending application Ser. No. 548,765 filed Feb. 10, 1975, now U.S. Pat. No. 3,867,192.

In some of the past refrigeration systems, the condenser coil was tapped or communicated with a pressure responsive device which was operably connected with means for varying the speed of the system fan motor. At least one of the disadvantageous or undesirable features of this past type of system and motor fan speed controlling scheme was the creation of another joint or tie into the system which increased the possibility of refrigerant leakage therefrom. Another disadvantageous or undesirable feature of this past type of system and fan motor speed controlling scheme was that another mechanically operating mechanism was included thereby to increase the likelihood of system failure due to mechanical malfunctions.

In other past refrigeration systems, the temperature of the condenser coil was utilized for controlling fan motor speed since such temperature may be correlated with the pressure of the refrigerant in the system in an attempt thereby to maintain the head pressure of the compressor generally constant. In many of this past type refrigeration systems and fan motor speed controlling schemes, the condenser coil temperature was measured at a selected location generally defining the interface of the gaseous and liquid phases of the refrigerant in the condenser coils by means, such as a thermistor or the like, attached by various suitable means to the condensor coil sensing the temperature at the phase interface. At least one of the disadvantageous or undesirable features of this particular past type of refrigeration system and fan motor speed control scheme is believed to be that the interface of the gaseous and liquid phases of the refrigerant varied location-wise in the condenser coil wherein the temperature sensing means in its selected phase interface location on the coil was subjected to temperatures of the refrigerant other than that selected at the phase interface thereof.

SUMMARY OF THE INVENTION

Among the several objects of the present invention may be noted the provision of a novel method of operating a refrigeration system, and a novel circuit and method for controlling the speed of an alternating current motor which overcome the disadvantageous or undesirable features discussed hereinabove, as well as others, with respect to the prior art; provision of such circuit and controlling method which is never subjected to more than a fraction of the line voltage applied to the motor thereof; and the provisions of such circuit and controlling method having components which are simplistic in design, economical to manufacture, and easily assembled. Other objects and advantageous features of the present invention will be in part apparent and in part pointed out hereinafter.

In general and in one form of the invention, a circuit is provided for controlling the speed of an alternating current motor. In this circuit, a gate controlled full wave alternating current switch is coupled in series relation with the motor. A phase control circuit is coupled in parallel relation with the switch and is operable generally for providing signals indicative of the occurrence of certain conditions. Means is provided for transmitting the indicative signals to the gate of the switch to control the duration of the conduction thereof in either direction and thereby vary the energy delivered to the motor for controlling its speed in accordance with the occurrence of the certain conditions.

Also in general and in one form of the invention, a method is provided for controlling the speed of an alternating current motor. In this controlling method, means adapted to be rendered conductive in either direction of the alternating current is coupled in parallel with a dropping impedance for the motor and in series with the motor for by-passing the dropping resistance and passing energy to the motor. Signals are provided to means for controlling the by-passing and passing means indicative of the occurrence of certain conditions for rendering it conductive and for controlling the duration of the conduction thereof thereby to effect the passage of the energy to the motor for varying the speed thereof in accordance with the occurrence of the certain conditions.

BRIEF DESCRIPTION OF THE DRAWINGS

FIGS. 5a, 5b, and 5c illustrate exemplary current and voltage wave forms which may be achieved in the circuit of FIGS. 1 and 2.

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENTS

Figure 1:
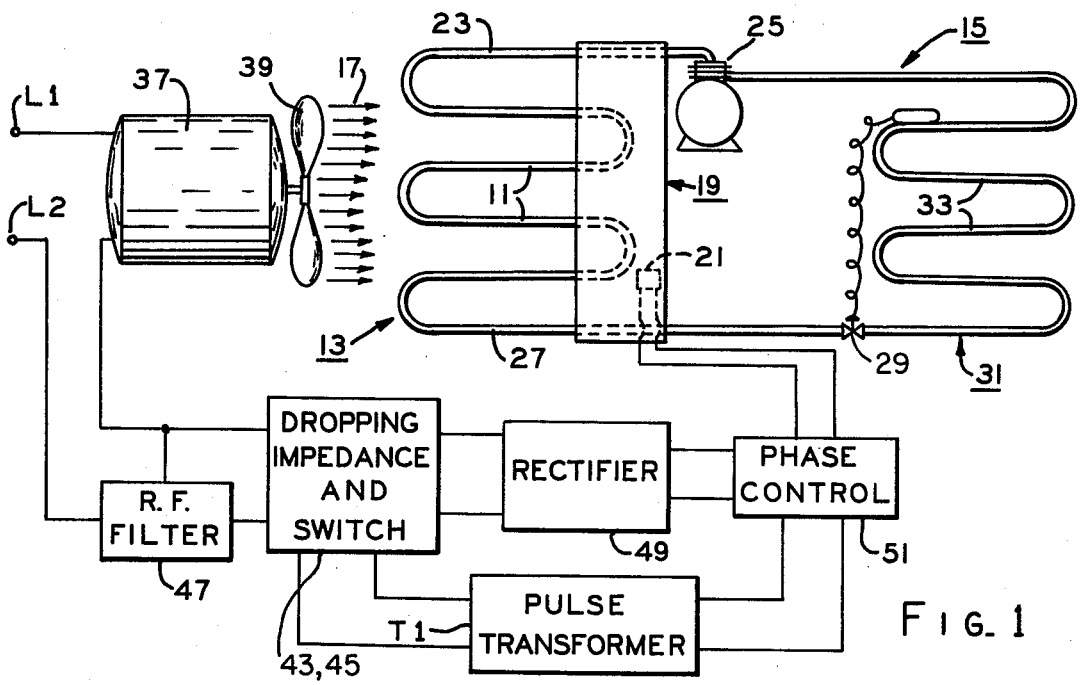
FIG. 1 is a schematic representation of a refrigeration system and a circuit for controlling the speed of an alternating current motor in one form of the invention which illustrates principles for practicing a method of controlling the speed of an alternating current motor also in one form of the invention.

Referring now to the drawings in general, there is illustrated a method for attaining a weighted average of the respective temperatures of at least some of a plurality of coils 11 of a condenser 13 for carrying a refrigerant (not shown) of a refrigeration system 15 and ambient air, indicated by a plurality of arrows 17, adapted to be flowed generally in a selected path past the condenser over the at least some coils 11 thereof (FIG. 1). In this weighted average temperature attaining method, means, such as a metallic member 19, is disposed across the at least some coils 11 and generally in the path of the ambient air 17 for heat transmitting engagement therewith, respectively, and means, such as a temperature sensitive resistor or a thermistor 21 or the like, for sensing temperature is coupled to heat transmitting means or metallic member 19 at a predetermined location thereon with respect to coils 11 and the ambient air flow 17 at which the weighted average temperature may be sensed FIGS. 1, 3 and 4.

Figure 3:
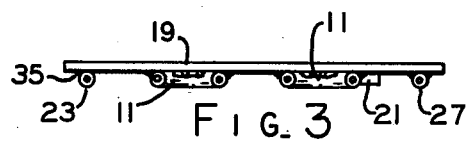
FIGS. 3 and 4 are fragmentary views taken from FIG. 1 showing means for attaining a weighted average temperature of the condenser coils and ambient air flow thereover in one form.
Figure 4:
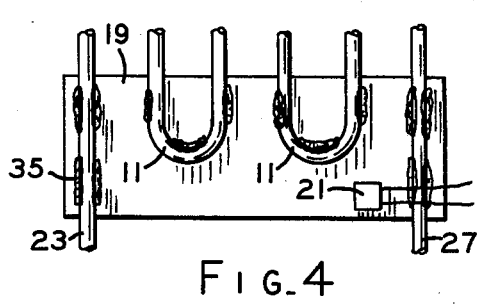

More particularly and with specific reference to FIGS. 1, 3 and 4, metallic member 19 is shown for purposes of disclosure as a generally rectangular, flat, thin strip or plate of any particular metal having good thermal or heat transferring or conductive properties; however, it is contemplated that the metallic member may be provided in various shapes and configurations within the scope of the invention. Metallic member 19 extends across coils 11 in heat transferring relation or heat transmitting engagement therewith spanning from a first condenser coil 23 which is communicated with the outlet or pressure head side of a compressor 25 of system 15 to a last condenser coil 27 which is communicated with the inlet side of an expansion valve 29 of the system. An evaporator 31 has a plurality of cooling coils 33 interposed between the outlet side of expansion valve 29 and the inlet side of compressor 25. While metallic member 19 is illustrated as extending in heat transmitting engagement across all of coils 11, it is contemplated that the metallic member could span any selected number of the coils so as to properly attain the weighted average temperature, as discussed in detail hereinafter, within the scope of the invention. Coils 11 and metallic member 19 are coupled together in the aforementioned heat transferring engagement by suitable means, such as soldering at 35 or the like; however, it is contemplated that other coupling materials or coupling methods may be utilized to couple the coils to the metallic member within the scope of the invention.

As well known in the art, a refrigerant in its gaseous state and at a relatively high temperature is received from evaporator 31 by compressor 25 which then compresses the gaseous refrigerant to increase the pressure thereof, i.e., the head pressure of system 15, to a selected value at which the system is designed to operate most efficiently. The compressed gaseous refrigerant flows from compressor 25 through condenser 13 where it condenses back to its liquid state for delivery to expansion valve 29. At the expansion valve 29, the relatively hot liquid refrigerant is expanded back into its gaseous state thereby to cool the refrigerant, and the relatively cool gaseous refrigerant is then passed through evaporator 31 for cooling a given space (not shown). In the performance of its cooling function or operation in evaporator 31, the gaseous refrigerant, of course, is again heated and returns to the inlet side of compressor 25 for recirculation through system 15.

As previously mentioned, the temperature of condenser 13 is correlative with the head pressure of compressor 25 in system 15, and it is desirable to maintain the condenser temperature generally at a predetermined temperature or within a predetermined temperature range thereby to maintain the compressor head pressure at a generally constant predetermined value for compressor 25 which will, of course, maximize the efficiency of system 15, as is well known in the art. However, at any given or selected location on metallic member 19, the temperature thereof may vary depending, of course, on the spaced relation of such location with respect to coils 11 and the path of the ambient air flow 17. As a result, it is necessary to predeterminately locate thermistor 21 on metallic member 19 with respect to coils 11 and the flow path of the ambient air in order that the thermistor may sense a temperature value which is, in fact, a predetermined or desired weighted average of the respective temperatures of coils 11 spanned by the metallic member and the ambient air 17 flowed past condenser 13 when system 15 is operated generally at the maximum efficiency and head pressure for which it was designed. This predetermined location of thermistor 21 on metallic member 19 may vary with respect to the type of system and its required operating characteristics. However, the position or predetermined location of thermistor 21 on metallic member 19 wherein generally about two-thirds to about five-eighths of the temperature of the metallic member is determined by the temperature of coils 11 and approximately $\frac{1}{3}$ to approximately $\frac{3}{8}$ of the temperature of the metallic member is determined by the ambient air flow 17 past condenser 13 has been found to be satisfactory to provide the desired weighted average temperature to be sensed by the thermistor. Of course, once the predetermined location of thermistor 21 on metallic member 19 has been ascertained to effect the desired weighted average temperature for maintaining generally constant the efficiency and head pressure of compressor 25 in any particular system, such as system 15, then such predetermined location may be utilized with respect to the manufacture and assembly of other condensers for use in such particular system. To complete the discussion with respect to the predetermined location of thermistor 21 on metallic member 19 in system 15, it may be noted that the thermistor is positioned on the metallic member downstream of condenser 13 with respect to the path of ambient air 17 passed through the condenser, and it may be desirable to position the thermistor so as to be, at least in part, protected or shielded from the ambient air flow 17.

Referring now again to the drawings in general, in refrigeration system 15 there is provided at least condenser 13 having coils 11 for passage therethrough of a refrigerant (not shown) of the system, and means, such as a variable speed alternating current fan motor 37, is operable generally for directing ambient air flow 17 in preselected path past or through the condenser upon the occurrence of certain conditions (FIG. 1). In this system 15, means for attaining a weighted average of the temperatures of at least some of coils 11 and the ambient air flow 17 is generally constituted by means, such as metallic member 19, disposed across at least some of coils 11 and generally in the path of the ambient air flow for heat transfer therewith, respectively (FIGS. 1, 3 and 4).

More particularly, fan motor 37 may be of any type well known to the art in which the speed thereof may be varied, and a fan or fan blade 39 is mounted to a rotatable shaft of the motor for driving or directing the ambient air flow through condenser 13, as shown in FIG. 1. Thermistor 21 may be coupled to metallic member 19 at the predetermined location thereon with respect to condenser coil 11 and the ambient air flow 17, as discussed above.

In addition, system 15 is implemented with means, such as a circuit 41 in one form of the invention shown in FIGS. 1 and 2 and discussed in detail hereinafter for controlling or varying the speed of fan motor 37. Circuit 41 is responsive to the temperature sensed by thermistor 21 for varying the speed of air flowing means or fan motor 37 to effect the regulation of the temperature of the condensing means or condenser 13. As previously mentioned, thermistor 21 is predeterminately located on metallic member 19 generaly downstream of condenser coils 11 with respect to the path of the ambient air flow 17 through condenser 13 for sensing the weighted average temperature of both the condenser coils and the ambient air flow. Upon the occurrence of the aforementioned certain or preselected conditions, such as for instance the drifting of the temperature sensed by thermistor 21 from the predetermined or desired weighted average temperature, the thermistor is operable generally to signal such temperature drift to circuit 41. In response to the signals of thermistor 21, circuit 41 is operable generally to vary, i.e., to increase or decrease, the speed of fan motor 37 so that the ambient air flow 17 generated by fan 39 is correspondingly varied. In this manner, variations in the speed of fan motor 37 results in a corresponding variation of the ambient air flow 17 through condenser 13, and the temperature of the condenser is regulated by the cooling action of the ambient air flow 17 on condenser coils 11 and metallic member 19 to correct or compensate for any drift from the desired weighted average temperature.

Figure 2:
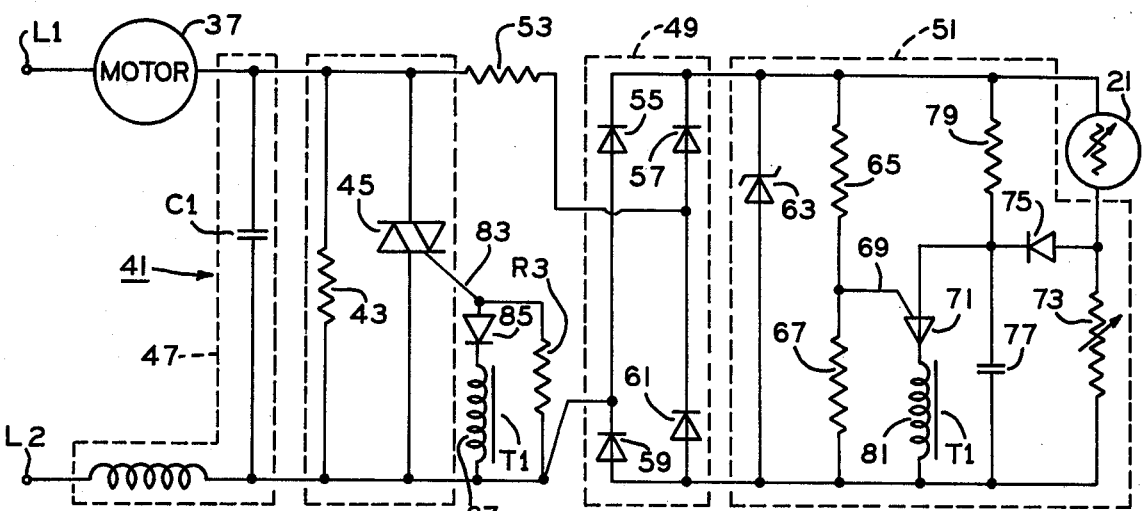
FIG. 2 is a more detailed schematic diagram of the electrical components of FIG. 1.

Circuit 41 is provided for controlling the speed of variable speed fan motor 37, as previously mentioned, and the fan motor may be energized across a pair of line terminals L1, L2 which are adapted to be connected to a source of alternating current, such as for instance a standard 230 A.C. source or the like, as illustrated in FIGS. 1 and 2. In series relation with fan motor 37 across line terminals L1, L2 is a dropping impedance, such as a resistor 43, and a bidirectional solid state control rectifier or switch, such as a Triac 45 or the like, is coupled in parallel relation across the dropping impedance and also in series relation with the fan motor across the line terminals. Switch 45 is a gate controlled full wave alternating current switch designed to switch from a blocking or nonconducting state to a conducting state for either polarity of alternating current voltage applied thereto with either positive or negative gating; however, as employed in circuit 41 only negative gate triggering is required. It may be noted that the parallel combination of dropping impedance 43 and switch 45 are operable generally to effect the regulation or variation of the speed of fan motor 37 generally as a function of the weighted average temperature sensed by thermistor 21 through metallic member 19, as previously mentioned. Fan motor 37 is, of course, operated at its lowest speed mode when switch 45 is nonconducting wherein current flows across line terminals L1, L2 through the series combination of dropping impedance 43 and the fan motor. The operation of circuit 41 may be better understood by considering FIG. 1 in conjunction with FIG. 2 wherein dropping impedance 43 and switch 45 have been enclosed in numbered dotted lines as are a radio frequency filter 47, a rectifier 49, and a phase control unit or circuit 51.

Assuming that the weighted average temperature of condenser 13 and the ambient air flow 17 as sensed by thermistor 21 through metallic member 19 has drifted or varied upwardly so as to be greater than the desired weighted average temperature, fan motor 27 will continue to be supplied with energizing current by way of dropping impedance 43. Rectifier 49 may be constituted by diodes 55, 57, 59 and 61 respectively connected in a simple diode bridge circuit which provides at its output terminals a pulsating direct current, as well known in the art, to phase control circuit 51. A zener diode 63 may be provided across the output of rectifier 49 to limit the peak values of the pulsating direct current to a preferred value thus providing a voltage regulated power source for phase control circuit 51.

At the beginning of either positive or negative excursions of voltage across dropping impedance 43, the voltage across zener diode 63 begins a positive excursion toward and shortly reaches its regulated maximum value. This zener voltage is applied across a voltage divider circuit generally constituted by a pair of resistors 65, 67, and a fixed fraction of the zener voltage appears at a gate 69 of another solid state switch, such as a programmable unijunction transistor 71 or the like. Another voltage divider circuit is generally constituted by thermistor 21 and a variable resistor 73, and this second voltage divider circuit determines a second voltage which is less than the zener voltage and which is applied by way of another diode 75 to the upper terminal of a capacitor 77. In this manner, the charge on capacitor 77 can never exceed the voltage value across the second voltage divider circuit, i.e. across thermistor 21 and variable resistor 73. As the voltage across zener diode 63 begins its positive excursions, capacitor 73 begins to charge by way of a resistor 79 and thermistor 21. If and when the voltage across capacitor 77 exceeds the breakdown voltage of programmable unijunction transistor 71, as determined by the voltage divider potential on gate 69 thereof, the programmable unijunction transistor will conduct thereby to discharge capacitor 77 and induce a pulse wave form in a primary winding 81 of a pulse transformer T1. This induced pulse is fed back by way of pulse transformer T1 to a gate 83 of switch 45 thereby to trigger it to its conductive state and effectively short out or by-pass dropping impedance 43 wherein full line voltage may be supplied through the switch to fan motor 37 to effect operation thereof at a greater or increased speed. Diode 85 may be provided in series relation with another or a secondary winding 87 of pulse transformer T1 and switch gate 83 to prevent spurious control of switch 45.

So long as switch 45 is nonconductive, fan motor 37 receives only partial line voltage by way of dropping impedance 43; however, when the switch is conductive, full line voltage may be supplied to the fan motor, as discussed above. Considering now one-half cycle of the voltage across dropping impedance 43, if switch 45 begins conducting shortly after the beginning of the half-cycle, fan motor 37 will receive nearly full energizing current. However, if switch 45 does not conduct until late in the half-cycle, fan motor 37 will receive generally less current, and the speed of the fan motor will closely approximate the lowest speed operating mode thereof wherein the fan motor is continuously energized only across dropping impedance 43, as previously mentioned. Variations in the time at which switch 45 first conducts in the half-cycle therefore is employed to effect corresponding variations in the speed of fan motor 37.

It was earlier assumed that the weighted average temperature of condenser 13 and the ambient air flow 17 as measured by thermistor 21 through metallic member 19 exceeded the desired weighted average temperature at which system 15 is designed to operate, and as discussed above, circuit 41 was operable generally to increase the speed of fan motor 37 and the cooling effect of fan 37. In this manner, the increased speed of fan motor 37 correspondingly effects an increase in the value of the ambient air flow 17 which, in turn, acts to cool or reduce the temperature of condenser 13 so that the weighted average temperature of the condenser and the ambient air flow is returned to approximate the value of the desired weighted average temperature.

If the weighted average temperature of condenser 13 and the ambient air flow 17 as measured by thermistor 21 through metallic member 19 decreases or drifts below the desired weighted average temperature at which system 15 is designed to operate, the resistance of the thermistor will increase thus lowering the voltage divider potential at the cathode of diode 75. In this manner, the "full charge" for capacitor 77 is now at a generally lower voltage. This decrease in the voltage for capacitor 77 of course also increases the time constant for the capacitor circuit with any particular voltage value being reached later. Therefore, the breakdown voltage of programmable unijunction transistor 71 will be reached later and the pulse fed back to gate 83 of switch 45 later for each cycle. Thus, switch 45 is conducting for a lesser portion of each cycle to supply a lesser amount of energy to fan motor 37 thereby to decrease the speed thereof and the cooling effect of fan 39, as desired. In this manner, correction or compensation provided by circuit 41 to reduce the speed of fan motor 37 and the cooling effect of fan 39 correspondingly effects a reduction of the ambient air flow 17 through condenser 13 which, in turn, permits the temperature of the condenser to increase so that weighted average temperature of the condenser and the ambient air flow is returned to approximately the value of the desired weighted average temperature.

In each of FIGS. 5a, 5b and 5c, a reference or zero level of voltage or current is represented by a horizontal line, and for reference purposes, the voltage applied across line terminals L1, L2 is shown in dotted lines. The solid line wave forms are representative of total line current under different conditions and therefore different motor speeds. So long as switch 45 is non-conducting, motor 37 has the line voltage across dropping resistance 43 and is running in its slower speed mode, as illustrated in FIG. 5a; however, when the switch is conducting, full line voltage is applied across the motor, and it runs in its higher speed mode as illustrated in FIG. 5c. As previously discussed hereinbefore, variations in the time at which switch 45 conducts in the half-cycle is employed to effect corresponding variations in the speed of fan motor 37, as may be illustrated in FIG. 5b.

Further, there is also illustrated in one form of the invention a method of controlling the speed of an alternating current motor, such as fan motor 37 for instance. In this speed controlling method, means, such as switch 45, adapted to be rendered conductive in either direction of the alternating current is coupled in parallel with dropping impedance 43 for motor 37 and in series with the motor for by-passing the dropping impedance and for passing energy to the motor. Signals are provided to means, such as phase circuit 51, for controlling the by-passing and passing means or switch 45 indicative of the occurrence of certain or preselected conditions for rendering it conductive and for controlling the conduction thereof thereby to effect the passage of the energy to motor 37 for varying the speed thereof in accordance with the occurrence of the certain conditions.

From the foregoing, it may be noted that control circuit 41 is never subjected to a voltage greater than the voltage drop across dropping impedance 43 which typically may be generally about one-half the line voltage; therefore, components with lower voltage rating which are correspondingly less expensive may be employed in the circuit thereby to reduce the overall cost thereof. Also, there is very little current flow through sensing thermistor 21 wherein its accuracy is not impaired by the heating effect of control current flowing therethrough. Rectifier circuit 49 has the current flow therethrough limited by resistor 53 and further does not carry motor current thus allowing the use of relatively inexpensive diodes 55, 57, 59 and 61. The use of metallic member 19 generally as a heat sink to attain the weighted average temperature for condenser coils 11 and the ambient air flow 17 provides a more accurate and representative temperature indication for the operation of system 15, and metallic member 19 is not sensitive to transient temperature variations or localized temperature conditions at any one location of the condenser coils.

The following illustrates component values which may be employed for the electronic components of circuit 41.

| | |
|---|---|
| C1,77 | 0.1 uf, 200 v. |
| 21 | 5K ohms at 20° C. |
| 55,57,59,61,75,85 | 200 v, 0.75 amp. |
| 63 | 20 v, 1 w. |
| 65,67 | 3.3K ohms, 0.5 w. |

-continued

| | |
|---|---|
| 73 | 0–10K ohms, 0.5 w. |
| 79 | 150K ohms, 0.5 w. |
| R3 | 100 ohms, 0.5 w. |
| 43 | 55 ohms, 500 w. |
| 45 | 200 v. |
| 53 | 10K ohms, 5 w. |

It is now apparent that a novel method for controlling the speed of an alternating current motor have been presented meeting the objects and advantageous features set out hereinbefore, as well as others. Further, it is contemplated that variances in the precise manner of practicing the method and that changes as to the arrangements, shapes, details and connections of the component parts of the control circuit 41, which have been presented to illustrate the invention in one form thereof, may be made by those having ordinary skill in the art without departing from the spirit of the invention or the scope thereof as set out in the claims which follow.

What I claim as new and desire to secure by Letters Patent of the United States is:

1. A circuit for controlling the speed of an alternating current motor comprising a gate controlled full wave alternating current switch coupled in series relation with the motor, a phase control circuit coupled in parallel relation with said switch and operable generally for providing signals indicative of the occurrence of preselected conditions, a dropping resistance respectively coupled in series relation with the motor and in parallel relation with said switch, said dropping resistance being by-passed when said switch is conducting in either direction and providing a motor operating current path when said switch is non-conducting, and means for transmitting the indicative signals to the gate of said switch to control the duration of the conduction thereof in either direction and thereby vary the energy delivered to the motor for controlling its speed in accordance with the occurrence of the preselected conditions.

2. A circuit as set forth in claim 1, further comprising means for supplying a pulsating direct current to said phase control circuit, the pulsating direct current being derived from the alternating current supplied to the motor.

3. A circuit as set forth in claim 1, wherein said transmitting means comprises a pulse transformer having one winding thereof coupled to said phase control circuit and another winding thereof coupled to the gate of said switch.

4. A circuit as set forth in claim 1, wherein said switch comprises a triac.

5. A circuit as set forth in claim 1, wherein said phase circuit includes means for sensing the occurrence of the preselected conditions.

6. A circuit for controlling the speed of an alternating current motor comprising:
   a dropping resistance connected in series with the motor and operable generally in response to an alternating current supplied thereto to provide a reduced alternating current operating voltage to the motor;
   a phase control circuit including a variable control element for providing speed control signals which vary with variations of said control element in phase relative to the alternating current;
   means for supplying a pulsating direct current derived from the alternating current to said phase control circuit;
   gate controlled full wave alternating current switch means connected in parallel with said dropping resistance for by-passing it and for supplying generally full alternating current voltage to the motor when said switch means is conducting in either direction thereby controlling the energy delivered to the motor and the speed thereof; and
   means for coupling said phase control circuit to the gate of said switch means to control the duration of the conduction thereof in accordance with the speed control signals.

7. A circuit as set forth in claim 6, further comprising means disposed between said coupling means and the gate of said switch means for preventing spurious control of said switch means.

8. A circuit as set forth in claim 6, wherein said coupling means includes a pulse transformer having one winding thereof coupled to said phase control circuit and another winding thereof coupled to the gate of said switch means.

9. A circuit as set forth in claim 6, wherein said phase control circuit includes a semiconductor device, said control element rendering said semiconductor device conductive upon the occurrence of preselected conditions.

10. A circuit as set forth in claim 8, wherein said phase control includes a normally nonconductive semiconductor device connected in series with said one winding, and means including said control element for rendering said semiconductor device conductive at times relative to the pulsating direct current determined at least in part by the ohmic value of said control element.

11. A method of controlling the speed of an alternating current motor comprising the steps of:
   (a) coupling means adapted to be rendered conductive in either direction of the alternating current in parallel with a dropping resistance for the motor and in series with the motor for by-passing the dropping resistance and passing energy directly to the motor; and
   (b) providing signals to means for controlling the by-passing and passing indicative of the occurrence of a preselected condition for rendering it conductive and for controlling the duration of the conduction thereof thereby to effect the passage of the energy to the motor for varying the speed thereof in accordance with the occurrence of the preselected condition, the motor receiving a reduced energizing current by way of the dropping resistor when the first means is non-conductive and full energizing current through the first means when the first means is conductive.

* * * * *

UNITED STATES PATENT AND TRADEMARK OFFICE
CERTIFICATE OF CORRECTION

PATENT NO. : 4,093,899

DATED : June 6, 1978

INVENTOR(S) : Dann W. Denny

It is certified that error appears in the above-identified patent and that said Letters Patent are hereby corrected as shown below:

Col. 1, line 8, after "1975" delete ",";
      line 9, after "4,007,605" insert --,--;

Col. 2, line 13, delete "densor" and insert --denser--;
      line 27, delete "method of operat-";
      line 28, delete "ing a refrigeration system, and a novel";
      line 32, after ";" insert --the--.

Col. 3, line 47, delete "FIGS. 1, 3 and 4" and insert --(FIGS. 1, 3 and 4)--.

Col. 5, line 36, after "hereinafter" insert --,--;
      line 43, delete "generaly" and insert --generally--.

Col. 8, line 21, delete "in" and insert --by--;
      line 59, delete "of" and insert --on--;
      line 66, delete "20°C." and insert --25°C.--.

Col. 9, line 9, after "novel" insert --circuit 41 and a--;
      line 43, delete ",";
      line 48, delete ",";
      line 53, delete ",";
      line 55, delete ",".

UNITED STATES PATENT AND TRADEMARK OFFICE
CERTIFICATE OF CORRECTION

PATENT NO. : 4,093,899

DATED : June 6, 1978

INVENTOR(S) : Dann W. Denny

It is certified that error appears in the above-identified patent and that said Letters Patent are hereby corrected as shown below:

Col. 10, line 21, delete ",";
        line 25, delete ",";
        line 30, delete ",";
        line 35, delete ",".

Signed and Sealed this

*Twenty-seventh* Day of *March 1979*

[SEAL]

Attest:

RUTH C. MASON
*Attesting Officer*

DONALD W. BANNER
*Commissioner of Patents and Trademarks*